United States Patent
Jeng et al.

(10) Patent No.: US 8,273,230 B2
(45) Date of Patent: Sep. 25, 2012

(54) METHOD FOR MAKING MEMBRANE FUEL CELL ELECTRODES BY LOW-VOLTAGE ELECTROPHORETIC DEPOSITION OF CARBON NANOMATERIAL-SUPPORTED CATALYSTS

(75) Inventors: King-Tsai Jeng, Taoyuan County (TW); Wan-Min Huang, Taoyuan County (TW)

(73) Assignee: Atomic Energy Council—Institute of Nuclear Research, Lungtan, Taoyuan (TW)

( * ) Notice: Subject to any disclaimer, the term of this patent is extended or adjusted under 35 U.S.C. 154(b) by 0 days.

(21) Appl. No.: 12/071,165

(22) Filed: Feb. 15, 2008

(65) Prior Publication Data

US 2011/0024294 A1 Feb. 3, 2011

(51) Int. Cl.
*C25D 1/12* (2006.01)
(52) U.S. Cl. .................. 204/471; 204/622; 977/742
(58) Field of Classification Search .................. 204/471, 204/482, 622, 490, 491, 494
See application file for complete search history.

(56) References Cited

U.S. PATENT DOCUMENTS

| | | | | |
|---|---|---|---|---|
| 3,616,396 A | * | 10/1971 | Swanson | 204/482 |
| 4,681,667 A | * | 7/1987 | Utsumi et al. | 204/491 |
| 5,084,144 A | * | 1/1992 | Reddy et al. | 205/104 |
| 6,492,201 B1 | * | 12/2002 | Haba | 438/121 |
| 2005/0249993 A1 | * | 11/2005 | Horiuchi et al. | 429/32 |
| 2007/0295940 A1 | * | 12/2007 | Chen et al. | 252/500 |

OTHER PUBLICATIONS

Girishkumar, et al. "Single-Wall Carbon Nanotube-Based Proton Exchange Membrane Assembly for Hydrogen Fuel Cells", Langmuir 2005, 21, 8487-8494.*
Girishkumar, et al. "Carbon Nanostructures in Portable Fuel Cells: Single-Walled Carbon Nanotube Electrodes for Methanol Oxidation and Oxygen Reduction", J. Phys. Chem. B 2004, 108, 19960-19966.*
Boccaccini et al. "Electrophoretic Deposition of Carbon Nanotubes" (Review), Carbon 44 2006 3149-3160.*

* cited by examiner

Primary Examiner — Jeffrey T Barton
Assistant Examiner — Steven Rosenwald
(74) Attorney, Agent, or Firm — Jackson IPG PLLC

(57) ABSTRACT

A cathode electrophoretic deposition (EPD) suspension is provided by mixing an ionomer solution with an electrolyte. An anode EPD suspension is provided via mixing carbon nanomaterial (CNM)-supported catalyst with a solution of the same composition as that of the cathode EPD suspension. Ultrasonication and high-speed stirring are executed on the cathode and anode EPD suspensions, thus turning them into homogenous suspensions. There is provided a low-voltage EPD apparatus incorporated with a porous material to separate it into anode and cathode compartments. The anode and cathode EPD suspensions are filled in the anode and cathode compartments, respectively. An inert gas is introduced into the anode compartment for stirring the anode EPD suspension. An electrode base substrate is used as the anode of the EPD apparatus. A low-voltage direct current (DC) power supply is used to supply DC low voltage to the EPD apparatus, thus evenly coating a catalyst layer on the substrate. The catalyst layer coated on the substrate is washed with deionized water and dried, thus forming a membrane fuel cell (MFC) electrode.

13 Claims, 3 Drawing Sheets

METHOD FOR MAKING MEMBRANE FUEL CELL ELECTRODES BY LOW-VOLTAGE ELECTROPHORETIC DEPOSITION OF CARBON NANOMATERIAL-SUPPORTED CATALYSTS

BACKGROUND OF INVENTION

1. Field of Invention

The present invention relates to a method for making membrane fuel cell (MFC) electrodes using carbon nanomaterial (CNM)-supported catalysts and, more particularly, to a method for making MFC electrodes by low-voltage electrophoretic deposition (EPD) of CNM-supported catalysts with even and thin electrode catalyst layers.

2. Related Prior Art

In general, MFCs include direct methanol fuel cells (DMFC) and proton exchange membrane fuel cells (PEMFC). An MFC is an electrochemical power generating device incorporated with a proton exchange membrane as the solid polymer electrolyte. Such an acid-type MFC needs platinum-based catalysts with high corrosion resistances and enhanced electrocatalytic activities, e.g., platinum (Pt) and platinum-ruthenium (Pt—Ru), to ensure good performance and long service life. MFCs are able to provide high energy densities, high energy-conversion efficiencies, structural simplicity, excellent durability and portability; therefore, such fuel cells are actively being developed for uses in electric vehicles, laptop computers, mobile phones and other electronic products to replace conventional batteries.

The catalysts of an MFC are generally existing in forms of nano-sized particles, commonly called as nanocatalysts, evenly spread and attached to a conductive carbon black powder, such as Vulcan XC72 (Cabot). The conductive carbon black powder is used as a support for the catalyst with good ability to transfer electrons or currents. Generally, a thin catalyst layer is fabricated on the electrode surface using various methods. For instance, the catalyst can be directly coated on an ion exchange membrane, pre-coated on a separable base and then decaled onto the ion exchange membrane, or pre-coated on a substrate and then hot-pressed onto the ion exchange membrane. In addition, conventional ways to apply the catalysts include brushing, spraying and mesh printing. The objective is to provide an even and thin catalyst layer so as to increase the efficiency and reduce the resistance of the electrode.

With the advancement of nanotechnology, today several carbon nanomaterials (CNMs), e.g., carbon nanotube (CNT), carbon nanofiber (CNF), carbon nanocoil (CNC) and carbon nanohorn (CNH), are commercially available for uses in a variety of new applications. Due to their distinguished characteristics, including excellent electrical conductivities, high material purities and high electrochemical stabilities, these CNMs have been investigated as new catalyst supports, replacing carbon black powders, for the MFC nanocatalysts with an attempt to significantly improve the performances of MFCs. However, the CNMs are generally bulky in structures and much larger than the conductive carbon black powders in dimensions. If the catalysts are supported on such CNMs via a conventional coating process, the resultant catalyst layers are often too thick and slack. In addition, the high consumption of ionomer will cause high resistance in the catalyst layer and, in turn, give rise to poor cell performance. This problem is especially pronounced when a high catalyst loading, such as 2-4 mg Pt—Ru/cm$^2$, is generally required for a DMFC. Hence, the nanocatalysts supported on the CNMs so far cannot adequately be used in a MFC. The performance of a resultant membrane electrode assembly (MEA) is generally poor.

Therefore, the present invention is intended to obviate or, at least, alleviate the problems encountered in prior art.

SUMMARY OF INVENTION

The primary objective of the present invention is to provide a method for making MFC electrodes via low-voltage EPD of CNM-supported catalysts with high performances.

To achieve the primary objective, the cathode EPD suspension is provided via mixing Nafion (ionomer) solution with a supporting electrolyte. The anode EPD suspension is provided via mixing a CNM-supported catalyst with a solution of the same composition as the cathode EPD suspension. Ultrasonication and high-speed stirring are executed on both cathode and anode EPD suspensions, thus turning them into homogenous conditions. The EPD apparatus is incorporated with a porous material and separated into anode and cathode compartments. Then, the anode and cathode EPD suspensions are filled in the anode and cathode compartments, respectively. For the low-voltage EPD operation, an inert gas is introduced into the anode compartment for stirring the anode EPD suspension. A non-catalytic electrode base substrate is used as the anode of the EPD apparatus, while a Pt mesh electrode is employed as the cathode. Then, a low-voltage DC power supply is used to supply DC low voltages to the EPD apparatus, thus evenly coating a catalyst layer on the electrode base substrate. After the low-voltage EPD operation, the electrode base substrate coated with the catalyst layer is removed from the EPD apparatus. The catalyst layer coated on the electrode base substrate is washed with de-ionized water and dried, thus forming an MFC electrode.

Other objectives, advantages and features of the present invention will become apparent from the following descriptions referring to the attached drawings.

BRIEF DESCRIPTION OF DRAWINGS

The present invention will be described via the detailed illustration of the preferred embodiment referring to the drawings.

DETAILED DESCRIPTION OF PREFERRED EMBODIMENT

Figure 1:
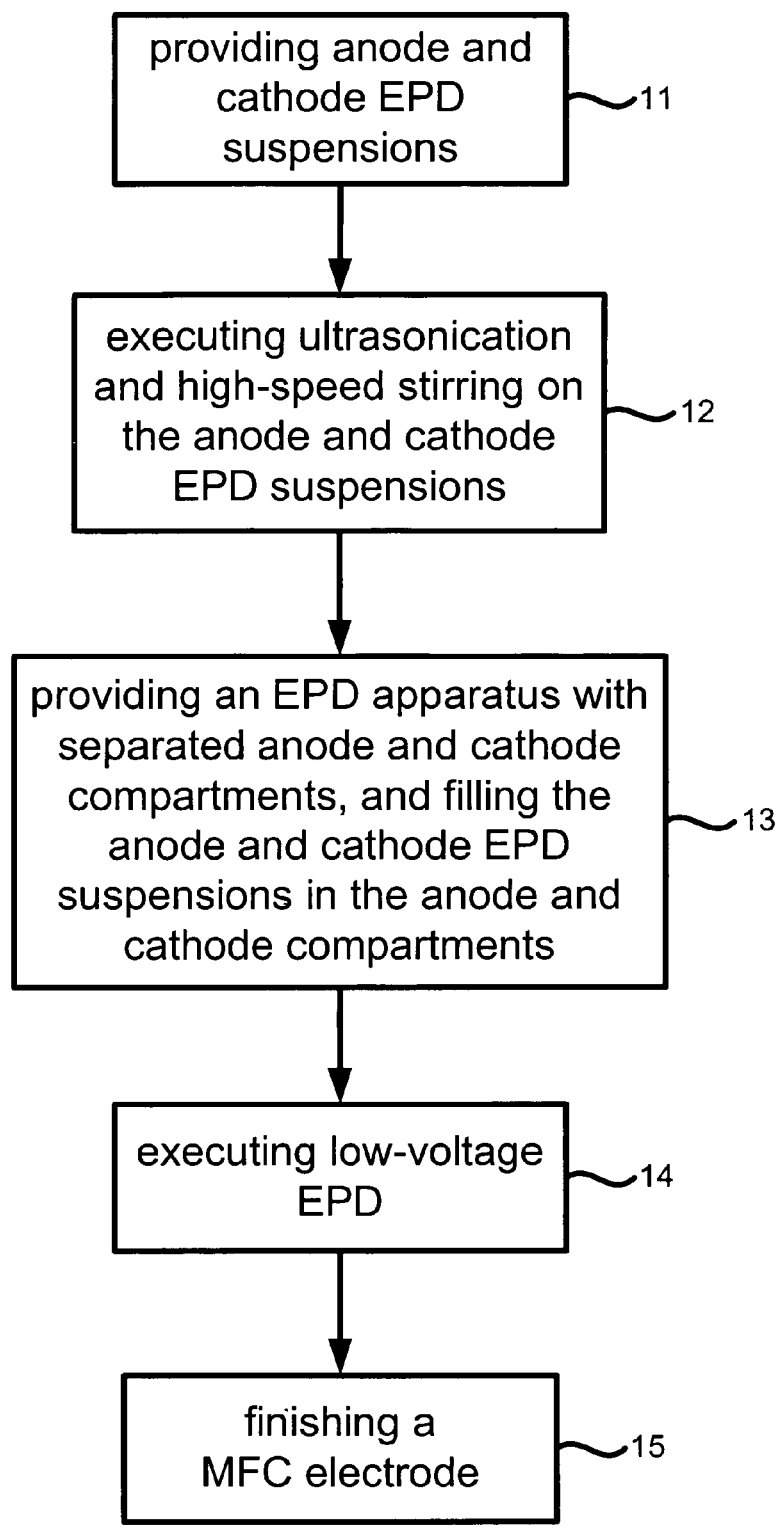
FIG. 1 is a flow chart of a method for making MFC electrodes by low-voltage EPD of CNM-supported catalyst according to the preferred embodiment of the present invention.
Figure 2:
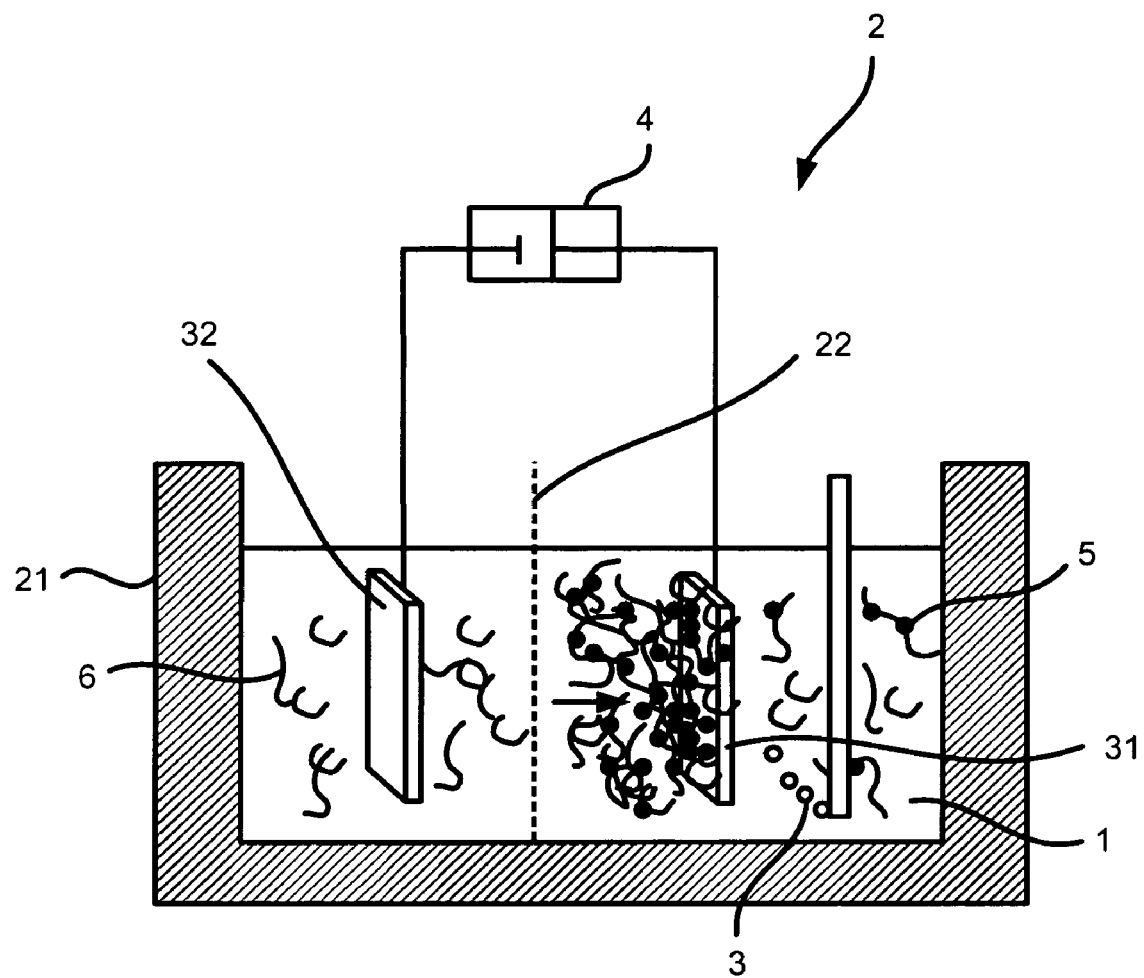
FIG. 2 is a cross-sectional view of an EPD apparatus used in the method shown in FIG. 1.

Referring to FIGS. 1 and 2, there is shown a method for making MFC electrodes by low-voltage EPD of CNM-supported catalyst according to the preferred embodiment of the present invention.

At 11, the anode and cathode EPD suspensions are made. The cathode EPD suspension is made via mixing an electrolyte with an ionomer solution. The anode EPD suspension is made via mixing a CNM-supported catalyst with a solution of the same composition as the cathode EPD suspension. The dry ratio of the CNM-supported catalyst to the ionomer is 1:4 to 1:10. The CNM can be CNT, CNF, CNC or CNH. The concentration of the nanocatalyst is 10 to 90 wt %. If used in a DMFC, the concentration of the nanocatalyst must be no less than 60 wt %. The nanocatalyst can be a platinum-based catalyst, such as platinum (Pt), platinum-ruthenium (Pt—Ru) and platinum-ruthenium-iridium (Pt—Ru—Ir). The ionomer solution can be a Nafion solution, which may contain other species, such as water, methanol, ethanol, and isopropanol.

At 12, ultrasonication and high-speed stirring are executed on both the anode and the cathode EPD suspensions. The anode and cathode EPD suspensions are subjected to the ultrasonication for 0 to 60 minutes before they are subjected to the high-speed stirring for 0 to 60 minutes, thus combining the CNM-supported catalyst with the ionomer to form catalyst/ionomer composites and homogenous suspensions.

At 13, an EPD apparatus 2 is provided. The EPD apparatus 2 includes an EPD cell 21 and a porous membrane 22 incorporated in the EPD cell 21, thus dividing the EPD cell 21 into an anode compartment and a cathode compartment. The anode EPD suspension is filled in the anode compartment and at the same time the cathode EPD suspension is filled in the cathode compartment. Because of the porous membrane 22 used as a separator, the generated gases would not be mixed with one another during the EPD operation. In the meantime, an inert gas 3 is introduced into the anode compartment for stirring purposes, thus preventing the possible formation of precipitation of the anode EPD suspension. The inert gas 3 can be nitrogen or argon.

At 14, the low-voltage EPD is executed. An electrode base substrate 31 is used as the anode of the EPD cell 21 while a platinum mesh 32 is used as the cathode of the EPD cell 21. A low-voltage direct current (DC) apparatus 4 is used as the power supply to provide a direct voltage of 0 to 5 volts through the EPD cell 21 for 0 to 180 minutes. Thus, the composite made from the combination of CNM-supported catalyst 5 with the ionomer 6 is directly and evenly coated onto the electrode base substrate 31, thus forming a catalyst layer on the surface. The electrode base substrate 31 can be a non-catalyzed gas diffusion electrode, a piece of carbon paper or a piece of carbon cloth.

At 15, an MFC electrode is made. After the low-voltage EPD operation, the electrode base substrate coated with the catalyst layer is removed from the EPD apparatus 2, washed with de-ionized water for several times, and finally dried so that the MFC electrode is made.

According to the above-discussed method, the catalyst is supported on the carbon nanomaterial before being used in the low-voltage EPD operation. Thus, the composition of the catalyst is easily controlled, and the stability of the catalyst is enhanced. The morphology and activity of the catalyst is excellent, simplifying the EPD operation. In addition, the performance of the electrode is improved. Hence, the catalyst is processed with the aqueous EPD suspension in the low-voltage EPD, and the electrode is used as the anode or cathode of an MFC depending on the catalyst employed. The catalyst layer on the electrode is even and thin, and the consumption of the catalyst is small. The structure of the EPD apparatus 2 is simple. Moreover, the operation of low-voltage EPD using an aqueous suspension is safer and more environmentally friendly compared to conventional EPD operations using non-aqueous suspensions and high voltage operations. It is no longer difficult to make an electrode from CNM-supported catalyst. These are the distinguished advantages of the present invention.

EXAMPLE 1

Carbon nanotube-supported platinum-ruthenium (Pt—Ru/CNT) catalyst is used in the low-voltage EPD as the catalyst of the anode of DMFC. In this case, the ionomer solution is 45 centiliters of 10% Nafion solution while the electrolyte is 5 centiliters of 70% perchloric acid solution. In the method shown in FIG. 1, there is used 0.25 gram of catalyst including 40% wt of platinum and 20% wt of ruthenium/CNT in the EPD. The resultant catalyst layer is smooth, thin and shining. The loading of the catalyst is about 0.103 mg/cm$^2$. Tested with cyclic voltammetry, the anode made according to the present invention has proven to provide excellent catalysis for the oxidation of methanol.

EXAMPLE 2

Carrying out performance tests of a single-cell DMFC using an anode prepared by low-voltage EPD. The anode described in the foregoing embodiment is used in a single-cell DMFC at 60 degrees Celsius. The cathode is a gas diffusion electrode coated with platinum black/carbon having a catalyst loading of 4 mg/cm$^2$. The electrodes and a proton exchange membrane (Nafion 117) are assembled together and hot pressed at 130 degrees Celsius under 60 times of the atmospheric pressure for 5 minutes, thus forming a membrane electrode assembly (MEA). Two graphite panels and two silicone gaskets are attached to the MEA, thus forming a single-cell DMFC. Moreover, a conventional brush-coating method is executed to make an anode that is used in the single-cell DMFC for comparison.

Figure 3:
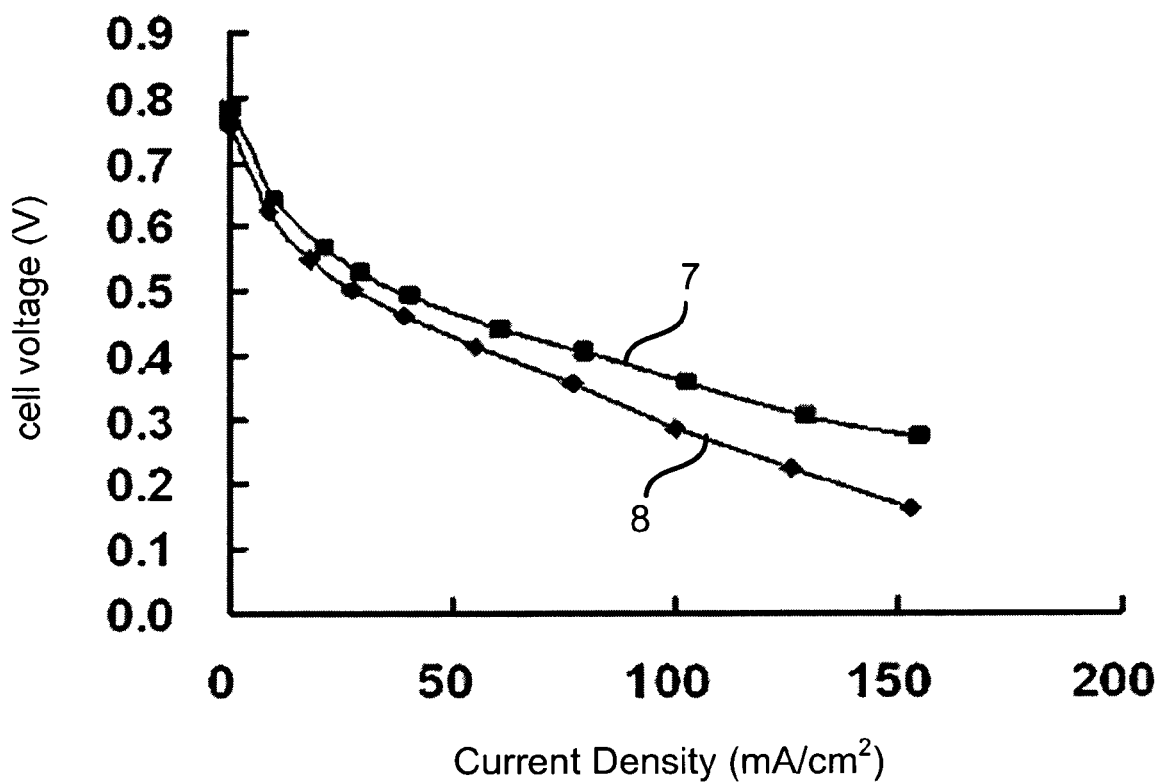
FIG. 3 illustrates cell voltage versus current density performance curves of a single-cell DMFC incorporated with an anode of present invention and an anode of conventional art, respectively.

Referring to FIG. 3, the plots of cell voltage versus current density curves of the DMFC performance are shown. The performance of an anode of the present invention is compared with a conventional anode in a single-cell DMFC stack. At 60 degrees Celsius, as the fuel at the anode, methanol is provided at 1 M/min. As the oxidizer at the cathode, air is provided at 200 ml/min. There is shown a performance curve 7 derived from the use of the anode of the present invention. In addition, there is shown a performance curve 8 derived from the use of the conventional anode. The amount of the catalyst of the anode of the present invention is equal to that of the conventional anode. It can be seen that the performance of the anode of the present invention is much better than the conventional counterpart. The method of the present invention has proven to be suitable to make electrodes for use in DMFC and PEMFC.

As mentioned above, in the low-voltage EPD, the electrode base substrate is coated with the CNM-supported catalyst to form the MFC electrode that can be used as the anode or cathode of a MFC. The advantages include (a) the catalyst layer on the substrate is even and thin, (b) the consumption of the CNM-supported catalyst is little, (c) the equipment is simple, and (d) the operation is safe and environmentally friendly.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a membrane fuel cell (MFC) electrode by low-voltage electrophoretic deposition (EPD) of carbon nanomaterial (CNM) supported catalyst comprising the steps of:
   providing an aqueous cathode EPD suspension via mixing an ionomer solution with electrolyte;
   providing an aqueous anode EPD suspension which is different from said aqueous cathode EPD suspension, via mixing a CNM-supported nanocatalyst with a solution of the same composition as that of the cathode EPD suspension, wherein a dry ratio of the CNM-supported nanocatalyst to the ionomer is 1:10 to 1:4 and wherein the CNM-supported nanocatalyst comprises 10 to 90 wt %;

executing ultrasonication before and then, separately, high-speed stirring on both the cathode EPD suspension and the anode EPD suspension, respectively, thus turning them into catalyst/ionomer composites and homogenous suspensions;

providing a low-voltage EPD apparatus with a porous membrane arranged to divide the low-voltage EPD apparatus into an anode compartment and a separate cathode compartment;

filling the anode and cathode EPD suspensions in the anode compartment and cathode compartment, respectively such that the porous membrane inhibits mixing of generated gases with one another;

introducing an inert gas into the anode compartment for stirring the anode EPD suspension and inhibiting formation of precipitation of the anode EPD suspension;

providing an electrode base substrate selected from the group consisting of non-catalyzed gas diffusion electrode, carbon paper and carbon cloth as the anode and a platinum mesh as the cathode in the EPD apparatus;

providing a low-voltage DC power supply to provide less than 5 volts DC to the EPD apparatus to evenly coat the composite of the CNM-supported nanocatalyst and the ionomer so as to form a catalyst layer on the electrode base substrate;

removing the substrate coated with the catalyst layer from the EPD apparatus;

washing the catalyst layer coated on the electrode base substrate with de-ionized water; and drying the catalyst layer coated on the substrate, thus forming the MFC electrode.

2. The method according to claim 1, wherein the MFC is selected from the group consisting of proton exchange membranes fuel cells (PEMFC) and direct methanol fuel cells (DMFC).

3. The method according to claim 1, wherein the CNM-supported catalyst is made via coating a nanocatalyst on a CNM selected from the group consisting of carbon nanotubes (CNT), carbon nanofibers (CNF), carbon nanocoils (CNC), and carbon nanohorns (CNH).

4. The method according to claim 3, wherein the nanocatalyst is made of platinum-based metal selected from the group consisting of Pt, Pt—Ru and Pt—Ru—Ir.

5. The method according to claim 1, wherein the CNM-supported catalyst comprises no less than 60 wt % of the nanocatalyst.

6. The method according to claim 1, wherein the MFC electrode is configured as an anode.

7. The method according to claim 1, wherein the MFC electrode is configured as a cathode.

8. The method according to claim 1, wherein the ionomer solution contains at least one of water, methanol, ethanol, and isopropanol.

9. The method according to claim 1, wherein the electrolyte is perchloric acid.

10. The method according to claim 1, wherein the ultrasonication firstly lasts for 0 to 60 minutes, and then the high-speed stirring lasts for 0 to 60 minutes.

11. The method according to claim 1, wherein the inert gas is selected from the group consisting of nitrogen and argon.

12. The method according to claim 1, wherein the DC voltage lasts for 0 to 180 minutes.

13. The method of claim 1, wherein the anode electrode base substrate is non-catalytic.

* * * * *